Aug. 2, 1932.   A. VAN DUYN   1,869,723
WEIGHING SCALE
Filed Feb. 20, 1928   2 Sheets-Sheet 2

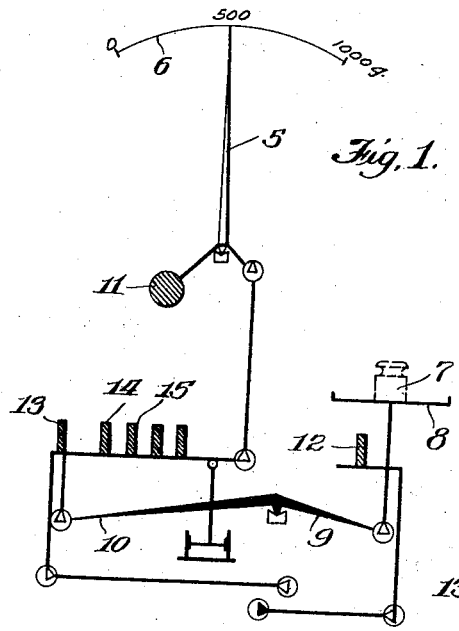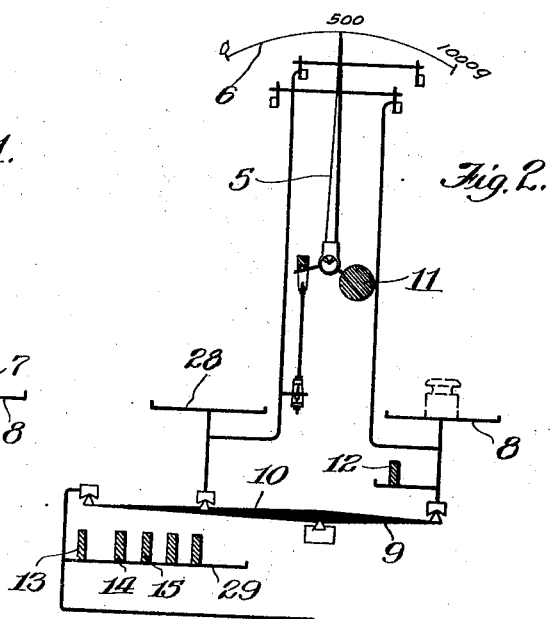

| A = 1 : 1 | | | | | | |
|---|---|---|---|---|---|---|
| B | C | 1Kg. | 2Kg. | 3Kg. | 4Kg. | =D |
| 1 | 2 | 4 | 8 | 12 | 16 | |
| 2 | 3 | 6 | 12 | 18 | 24 | |
| 3 | 4 | 8 | 16 | 24 | 32 | |
| 4 | 5 | 10 | 20 | 30 | 40 | |
| 5 | 6 | 12 | 24 | 36 | 48 | ⟩E |
| 6 | 7 | 14 | 28 | 42 | 56 | |
| 7 | 8 | 16 | 32 | 48 | 64 | |
| 8 | 9 | 18 | 36 | 54 | 72 | |
| 9 | 10 | 20 | 40 | 60 | 80 | |

| A = 1 : 2 | | | | | | |
|---|---|---|---|---|---|---|
| B | C | 1Kg. | 2Kg. | 3Kg. | 4Kg. | =D |
| 1 | 3 | 6 | 12 | 18 | 24 | |
| 2 | 4 | 9 | 18 | 27 | 36 | |
| 3 | 5 | 12 | 24 | 36 | 48 | |
| 4 | 6 | 15 | 30 | 45 | 60 | |
| 5 | 7 | 18 | 36 | 54 | 72 | ⟩E |
| 6 | 8 | 21 | 42 | 63 | 84 | |
| 7 | 9 | 24 | 48 | 72 | 96 | |
| 8 | 10 | 27 | 54 | 81 | 108 | |
| 9 | 11 | 30 | 60 | 90 | 120 | |

| A = 1 : 2 | | | | | | |
|---|---|---|---|---|---|---|
| B | C | 1Kg. | 2Kg. | 3Kg. | 4Kg. | =D |
| 1 | 4 | 8 | 16 | 24 | 32 | |
| 2 | 5 | 12 | 24 | 36 | 48 | |
| 3 | 6 | 16 | 32 | 48 | 64 | |
| 4 | 7 | 20 | 40 | 60 | 80 | |
| 5 | 8 | 24 | 48 | 72 | 96 | ⟩E |
| 6 | 9 | 28 | 56 | 84 | 112 | |
| 7 | 10 | 32 | 64 | 96 | 128 | |
| 8 | 11 | 36 | 72 | 112 | 144 | |
| 9 | 12 | 40 | 80 | 120 | 160 | |

| A = 1 : 2 | | | | | | |
|---|---|---|---|---|---|---|
| B | C | 1Kg. | 2Kg. | 3Kg. | 4Kg. | =D |
| 1 | 5 | 10 | 20 | 30 | 40 | |
| 2 | 6 | 15 | 30 | 45 | 60 | |
| 3 | 7 | 20 | 40 | 60 | 80 | |
| 4 | 8 | 25 | 50 | 75 | 100 | |
| 5 | 9 | 30 | 60 | 90 | 120 | ⟩E |
| 6 | 10 | 35 | 70 | 105 | 140 | |
| 7 | 11 | 40 | 80 | 120 | 160 | |
| 8 | 12 | 45 | 90 | 135 | 180 | |
| 9 | 13 | 50 | 100 | 150 | 200 | |

Witnesses:                    Inventor
                              Adrianus van Duyn
                              By Nissen & Crane
                              Attys.

Patented Aug. 2, 1932

1,869,723

UNITED STATES PATENT OFFICE

ADRIANUS van DUYN, OF ROTTERDAM, NETHERLANDS, ASSIGNOR TO NAAMLOOZE VENNOOTSCHAP MAATSCHAPPIJ TOT VERVAARDIGING VAN SNIJMACHINES VOLGENS VAN BERKEL'S PATENT EN VAN ANDERE WERKTUIGEN, OF ROTTERDAM, NETHERLANDS, A LIMITED LIABILITY COMPANY OF THE NETHERLANDS

WEIGHING SCALE

Application filed February 20, 1928, Serial No. 255,709, and in Germany March 2, 1927.

The present invention relates in general to weighing scales, and has for its primary object the provision of means for conveniently and accurately increasing the weighing capacity of scales, preferably of the counter type.

There are already in existence several kinds of counter scales in which the weighing capacity thereof may be increased by the use of loose additional weights, or additional fixed weights, so to speak, but in all of these prior devices, the alterations of the weighing capacity are confined to comparatively narrow limits. They do not permit of the weighing capacity of the scale to be extended arbitrarily. Furthermore, even with a relatively limited range of weighing capacity, they are so cumbersome and complicated that their manufacture and use has been more or less limited.

The objectionable features in these prior devices are overcome by the present invention which provides a scale, the systematic construction of which permits of an extension of the weighing capacity within a wide range.

Other objects of the invention will appear hereinafter, the novel features and combinations being set forth in the appended claims.

In the accompanying drawings, which have been selected for illustrating the salient features of the invention:

Fig. 1 is a diagrammatic view of one form of scale of the counter type embodying the present invention;

Fig. 2 is a similar view showing a modified form of a counter type scale embodying the present invention;

Figures 7, 8, 9, 10, 11:
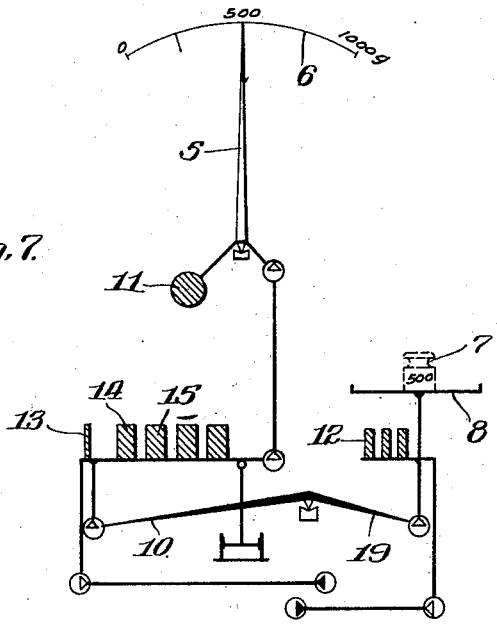

Figs. 3 to 6, inclusive, are charts to indicate the number of the weights employed for various weighing capacities and for various scale beam ratios;

Fig. 7 is a diagrammatic view of that type of counter scale shown in Fig. 1, but showing the use of heavier weights on the weight side of the scale than on the load side;

Figs. 8 to 11, inclusive, show chart forms with the weighing capacities obtainable at various scale beam ratios and various weight values on the weight side of the scale.

Referring now to the drawings in detail, the counter scale shown diagrammatically in Fig. 1 is shown in central position, in which position the pointer 5 playing in front of the chart 6 corresponds to the weight 7 imposed upon the load pan 8. Where the weighing capacity of the chart 6 is 1,000 grams, the weight 7 must have a value of 500 grams. In this scale, for the purpose of the present description, it will be assumed that the ratio of the two arms 9 and 10 of the scale beam is 1:2. Where the load placed upon the load pan 8 is less than the capacity load of 1,000 grams, or 1 kilogram, the counter-balancing momentum is developed solely by the load counter-balancing weight 11. In spite of this counter-balancing weight 11, there is to be placed for weighing operations, upon the load side of the scale, a loose weight 12; the same may be considered to equal 1 kilogram, for the purpose of the present description. This additional weight 12 is counter-balanced by a fixed counter-balancing weight 13 on the weight side of the scale. This fixed counter weight 13 remains permanently on the weight side of the scale and should have a value of ½ kilogram when the ratio of the two scale beams is 1:2 and when the weight 12 has a value of one kilogram.

If the weighing capacity of the scale shown in Fig. 1, is to be extended to a capacity of 2 kilograms, as an example, then there will be needed on the weight side of the scale an excess weight of 1 kilogram opposing the load side. To effect this balance, the weight 12 is removed, leaving the weight 13 only on the weight side of the scale as a counterweight to act upon the scale beam. Since the weight 13 equals ½ kilogram and now acts upon the double length of the scale beam, the result is an overweight of one kilogram on the weight side of the scale.

If it is desired to extend the weighing capacity of the scale shown in Fig. 1 to a capacity of three kilograms, there is needed on the weight side an overweight of two kilograms. This result is accomplished by replacing the weight 12 on the load side, the same, as previously stated, equaling one kilogram. This weight 12 is then counter-balanced, as above explained, by the fixed weight 13 on the weight side. Furthermore, the weight side of the scale is balanced by an additional weight 14, the same equaling one kilogram. In this way, an overweight of two kilograms is imposed on the weight side of the scale.

For an extension of the weighing capacity to four kilograms, the weight side of the scale will require an overweight of three kilograms. This is again accomplished by leaving the weight 13, as well as the weight 14, on the weight side of the scale and removing the weight 12 from the load side.

For an additional weighing capacity of from 4 to 5 kilograms, there is again needed on the weight side of the scale an overweight of four kilograms, which may be accomplished by the addition of another weight 15 equal to one kilogram, the weight 12 on the load side still remaining.

As previously stated, it is assumed that the weighing capacity of the chart 6 of the scale shown in Fig. 1 is one kilogram or 1,000 grams, and, in accordance with this capacity of the chart, loose weights of one kilogram each would be employed for increasing the weighing capacity. If the capacity of the chart was two kilograms and the weighing capacity of the scale was increased, a set of loose weights of two kilograms each would be employed. With the chart capacity of three kilograms, a set of loose weights of three kilograms each would be employed. In this way, it can be readily seen that the weighing capacity of the scale may be extended to a double capacity, triple capacity and more by always employing a number of uniform weights corresponding to the normal capacity of the scale chart. The weighing capacities obtained in the above described manner are, of course, dependent upon the ratio of the arms 9 and 10 of the scale beam. It has been found, as a basis for the present invention that the number of loose weights on the load side must always be smaller by one than the ratios of the arms of the scale beam. On this theory, with the scale beam ratio of 1:2, as shown in Fig. 1, the number of loose weights on the load side equals 1. With a scale beam ratio of 1:3, the number of loose weights on the load side will be equal to 2.

Proceeding on this theory, the charts or tables shown in Figs. 3 to 6, inclusive, have been computed. In the shart 16, shown in Fig. 3, A indicates or equals a scale beam ratio of 1:2. The column 17, under B, indicates the number of loose weights on the weight side to which must not be added, however, the counter balancing weight 13. The column 18, under C, indicates the total number of all of the loose weights to be employed on both the weight and load sides of the scale, particular attention being paid to the fact that the number of weights on the load side will always be smaller by one than the scale beam ratio. The horizontal column 19, ending with D, indicates the chart capacity of the scale and the vertical columns 20 to 23, inclusive, in the bracket E, indicate the weight capacities which may be obtained by selective employment of the loose weights with various chart capacities.

As an abstract example of the use of the chart shown in Fig. 3, in connection with the scale shown in Fig. 1, we will consider that the chart 6 has the capacity of one kilogram. To increase the weighing capacity of the scale to four kilograms, one additional weight, such as 14, is imposed on the weight side of the scale and an additional weight 12 is imposed on the load side. This makes a total of two additional weights. The column 18, under C, shows two and the column 20 under 1 kg. indicates 4. To increase this scale with the chart of 1 kilogram to a weighing capacity of 18 kilograms, as an example, 8 additional weights would be imposed on the weighing side of the scale and one on the load side, making a total of 9 additional weights and increasing the capacity of the scale to 18 kilograms.

As another example, with the scale having the chart 6 of four kilograms and it was desirable to increase the weighing capacity to 72 kilograms, it will be seen from the chart that 8 additional weights would be placed on the weight side of the scale and one on the load side. The maximum weighing capacity would be realized in this type of scale when all of the weights are placed on the weight side and when the loose weight 12 is lifted from the load side. When this is done, there will be a total weight of 4½ kilograms on the weight side including the counter-balancing weight 13 which, applied to the double-size scale beam, means a weight of 4½×2 which is 9 kilograms. The load counter-balancing weight 11 then assumes its position between the limits of the chart capacity, that is to say, between 9 kilograms and 10 kilograms. If, with the same ratio of scale beam, a larger chart 6 is used, say a two kilogram chart, the loose weights would each be 2 kilograms.

In the table 24, according to Fig. 4, the corresponding values are given for a weight beam ratio of 1:3. In that case, there would be placed two loose weights 12 upon the weight side and hence 6 loose weights is the total number of loose weights employed. With a chart capacity of one kilogram, a weighing capacity of 15 kilograms would be possible. With a chart capacity of 2 kilograms, a weighing capacity of 30 kilograms would be possible, and so on, until with a chart capacity of 4 kilograms, a weighing capacity of 60 kilograms would be possible. The horizontal column 25 of the table 24, in Fig. 4, has been used for this example. The tables 26 and 27, shown in Figs. 5 and 6, are compiled accordingly and are used in the same manner as the tables 3 and 4, the only difference being that the tables in Figs. 5 and 6 are compiled for a beam ratio of 1:4 and 1:5 respectively.

The scale illustrated in Fig. 1 may be modified, for instance, as illustrated in Fig. 2. The main distinction in these two embodiments is that there is provided a special pan or platform 28 in the form shown in Fig. 2. This platform 28 is arranged for the weights and the same rests on the arm 10 of the beam at a point different from that at which the pan 29 acts on the beam. This does not alter any results in the effect of the loose weights upon the scale beam. The loose weights placed upon the pan 28 have to be added in their true value to the readings indicated on the table.

The scales, according to the present invention, may also be equipped with loose weights which are not identical with each other but which are in a predetermined ratio to each other; that is, the loose weights on the weight side being in a predetermined ratio to the weights on the load side. A modified form of this type is illustrated diagrammatically in Fig. 7.

In this modification, all of the loose weights on the weight side have the same value. It may be assumed that the weights 14 and 15, each have a value of 2 kilograms. The fixed weight 13, however, is selected so that it will counterbalance a loose weight on the load side. The loose weights 12 on the load side are also each of the same value. They correspond to the weighing capacity of the chart; that is, to say, if the chart having a weighing capacity of 1 kilogram is used, each of the weights has a value of one kilogram.

It will be observed that the number of weights on the load side of the scale is not only dependent upon the ratio of the beam but also upon the ratio of the weights. The number of weights on the load side is always smaller by one than the product of the ratio of the beam and the ratio of the weights. Assuming, as an example, and as shown in Fig. 7, the beam ratio equals 1:2 and the weight ratios 12 and 13 equal 2:1, then a product of these ratio values is the product 2×2, which equals 4. Therefore, for this case, the number of loose weights to be employed on the load side is 4 minus 1 which equals 3.

The tables 30 to 33, inclusive, shown in Figs. 8 to 11, inclusive, have been prepared on the above basis.

In the arrangement of the table 30 in Fig. 8, a set of loose weights is employed, of two kilograms, on the weight side. In the table 31 in Fig. 9, there is employed on the weight side, a set of loose weights of 1.5 kilograms each. In the table 32 of Fig. 10, the loose weights employed on the weight side are two kilograms each. In general, the weighing capacities may be computed from the tables 30 to 33, inclusive, in the same way as has been described with reference to the tables 16, 24, 26 and 27, shown in Figs. 3 to 6, inclusive.

Obviously those skilled in the art may make various changes in the details and arrangement of parts without departing from the spirit and scope of the invention as defined by the appended claims, and I wish therefore not to be restricted to the precise construction herein disclosed.

I claim:—

1. In a weighing scale, the combination with a weigh beam, of a fulcrum for supporting said weigh beam so that the portion thereon on one side of the fulcrum is longer than the portion on the opposite side thereof, a weigh pan on the shorter portion of said weigh beam, a pointer connected to the longer portion thereof for indicating the weight of an article placed on said weigh pan, a counterbalance movable with said pointer and a series of loose weights, of equal weight adapted to be selectively placed on opposite ends of the scale pan to increase the weighing capacity of said scales.

2. A weighing scale as claimed in claim 1 in which the weights are of a value equal to the normal capacity of the scales.

3. In a weighing apparatus the combination with a weigh-beam mounted on a fulcrum, of a weight support mounted on said weigh-beam on one side of said fulcrum, a second weight support mounted on said weigh-beam on the opposite side of said fulcrum, said second support being at such a distance from said fulcrum that its effective leverage is greater than the effective leverage of said first support, indicating means operatively connected to said weigh-beam and having a scale which indicates the normal capacity of the weighing apparatus, a load pan operatively connected to said weigh-beam for actuating said weigh-beam when a load is placed on said load pan, a weight adapted to rest on said first support equal to the amount by which the capacity of said weighing apparatus is to be increased and acting on said weigh-beam in the same direction as said load pan, a second weight on said second support equal to the product of said first weight and the inverse ratio between the leverages of said second and first mentioned supports respectively, said weights normally balancing each other to neutralize their effect on the indicating means and the weighing capacity of the weighing apparatus, additional weights each of which is equal in value to said first mentioned weight, all of said weights which are equal in value to said first mentioned weight together with said first mentioned weight being thereafter employed to increase the weighing capacity of said weighing apparatus by increments equal to the first mentioned weight.

4. In a weighing apparatus the combination with a weigh-beam mounted on a fulcrum, of a weight support mounted on said weigh-beam on one side of said fulcrum, a second weight support mounted on said weigh-beam on the opposite side of said fulcrum, said second support being at such a distance from said fulcrum that its effective leverage is greater than the effective leverage of said first support, indicating means operatively connected to said weigh-beam and having a scale which indicates the normal capacity of the weighing apparatus, a load pan operatively connected to said weigh-beam for actuating said weigh-beam when a load is placed on said load pan, a weight adapted to rest on said first support equal to the amount by which the capacity of said weighing apparatus is to be increased and acting on said weigh-beam in the same direction as said load pan, a second weight on said second support equal to the product of said first weight and the inverse ratio between the leverages of said second and first mentioned supports respectively, said weights normally balancing each other to neutralize their effect on the indicating means and the weighing capacity of the weighing apparatus, a set of additional weights each of which has a value which is a multiple of said first mentioned weight, a second set of additional weights equal in value to said first mentioned weight, said additional weights together with said first mentioned weight being employed for the purpose of increasing the weighing capacity of said weighing apparatus by increments equal to the first mentioned weight.

5. A weighing system which employs a weighing apparatus such as set forth in claim 3, and a chart which enables one to quickly determine the number of weights to be placed on each of said supports of said weighing apparatus in order to obtain a desired weighing capacity for the weighing apparatus.

6. A weighing system which employs a weighing apparatus such as set forth in claim 4, and a chart which enables one to quickly determine the number of weights to be placed on each of said supports of said weighing apparatus in order to obtain a desired weighing capacity for the weighing apparatus.

In testimony whereof I have signed my name to this specification on this sixth day of February, A. D. 1928.

ADRIANUS van DUYN.